(12) United States Patent
Deshpande

(10) Patent No.: US 10,594,499 B1
(45) Date of Patent: Mar. 17, 2020

(54) DEFAULT DATA SESSION FOR A WIRELESS COMMUNICATION NETWORK

(71) Applicant: T-Mobile USA, Inc., Bellevue, WA (US)

(72) Inventor: Mallika Deshpande, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/249,707

(22) Filed: Jan. 16, 2019

(51) Int. Cl.
| | | |
|---|---|---|
| H04L 12/14 | (2006.01) | |
| H04W 4/24 | (2018.01) | |
| H04M 15/00 | (2006.01) | |
| H04W 88/16 | (2009.01) | |
| H04W 76/00 | (2018.01) | |

(52) U.S. Cl.
CPC ........ *H04L 12/1407* (2013.01); *H04M 15/64* (2013.01); *H04M 15/866* (2013.01); *H04M 15/887* (2013.01); *H04W 4/24* (2013.01); *H04W 76/00* (2013.01); *H04W 88/16* (2013.01)

(58) Field of Classification Search
CPC . H04L 12/1407; H04M 15/64; H04M 15/866; H04M 15/887; H04W 4/24; H04W 76/00; H04W 88/16
USPC ........................................................ 455/406
See application file for complete search history.

(56) References Cited

U.S. PATENT DOCUMENTS

| | | | | |
|---|---|---|---|---|
| 8,897,749 | B1* | 11/2014 | Ephraim | .................. H04L 12/14 455/406 |
| 2011/0320323 | A1* | 12/2011 | Cuervo | ............... H04L 12/1407 705/30 |
| 2014/0335815 | A1* | 11/2014 | Ephraim | .................. H04L 12/14 455/406 |

OTHER PUBLICATIONS

3GPP TS 29.213 V15.5.0 (Dec. 2018).*
3GPP TS 32.296 V15.0.0 (Jun. 2018).*
3GPP TS 29.219 V15.1.0 (Mar. 2018).*

* cited by examiner

*Primary Examiner* — William Nealon
(74) *Attorney, Agent, or Firm* — Han Santos, PLLC

(57) ABSTRACT

Aspects of the present disclosure are directed to communication between a policy engine and a charging engine of a wireless communication network. In one example, the charging engine maintains a data store that includes counters and corresponding service identifiers of one or more subscribers of the wireless communication network. In operation, the charging engine receives a status request message from the policy engine, where the status request message is a request for information on a counter associated with a service identifier. The charging engine may determine that the service identifier is not included in the data store and in response thereto generate a default response message that includes nominal data. The charging engine then sends the default response message to the policy engine to enable the policy engine to implement a default policy for allowing a data session between a user device and the wireless communication network.

19 Claims, 6 Drawing Sheets

POLICY ENGINE 114  CHARGING ENGINE 116

400

402 — RECEIVE THE FIRST DATA PROFILE ASSOCIATED WITH THE FIRST SERVICE IDENTIFIER

404 — UPDATE DATA STORE TO INCLUDE THE FIRST COUNTER AND THE FIRST SERVICE IDENTIFIER

406 — GENERATE/SEND UPDATED RESPONSE MESSAGE INCLUDING THE FIRST SERVICE IDENTIFIER AND A STATUS OF THE FIRST COUNTER

408 — RECEIVE UPDATED RESPONSE MESSAGE

410 — SWITCH FROM THE DEFAULT POLICY TO AN UPDATED POLICY FOR THE DATA SESSION

FIG. 4

Policy-Counter-Status-Report ::= < AVP Header: 2903 >
    { FeatureName}
    { Policy-Counter-Identifier }
    { Policy-Counter-Status }
    *[ Pending-Policy-Counter-Information ]
    *[ AVP ]

FIG. 5

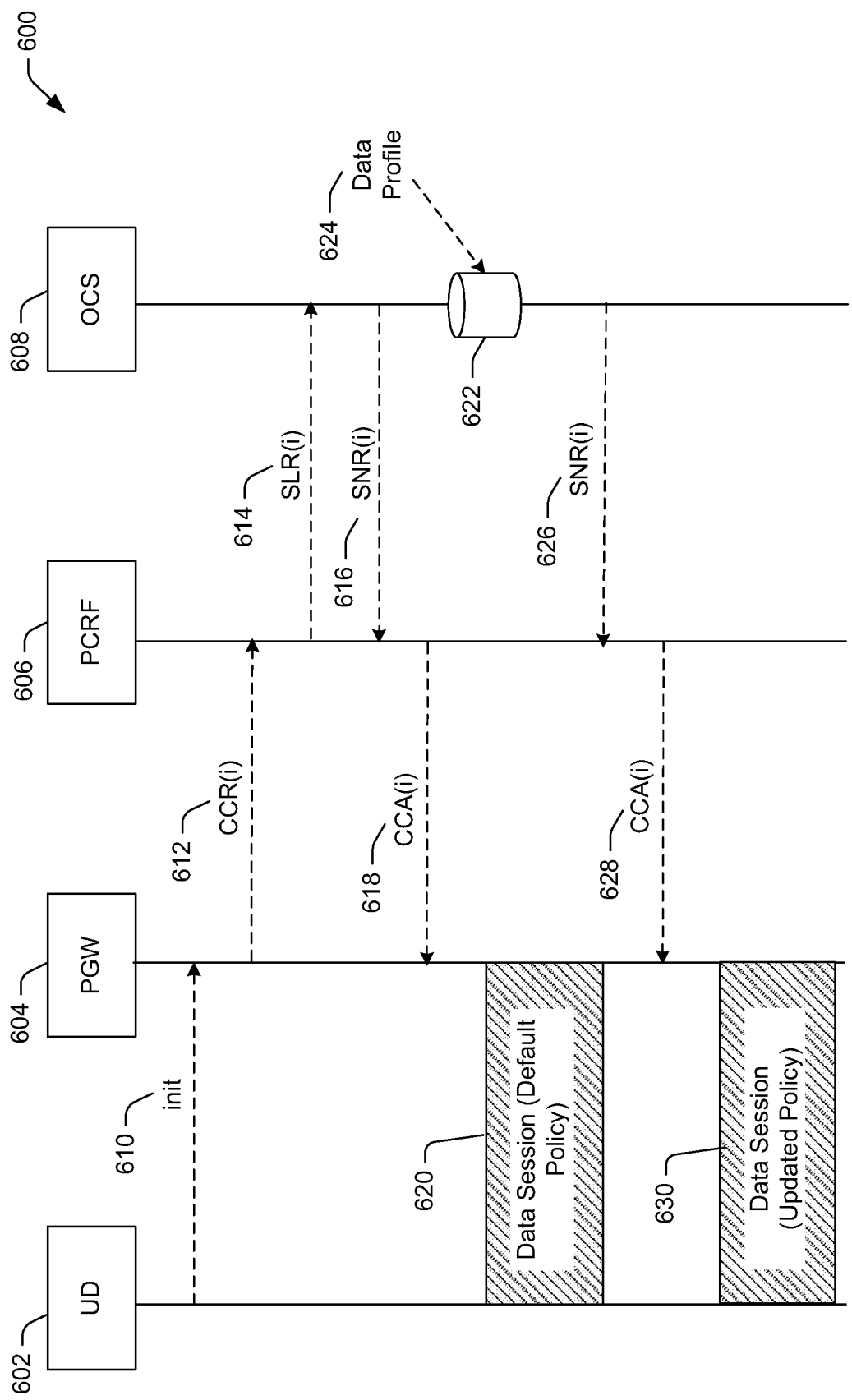

DEFAULT DATA SESSION FOR A WIRELESS COMMUNICATION NETWORK

BACKGROUND

Wireless communication devices are integral to the daily lives of most users. Wireless communication devices are used to make voice calls, check email and text messages, update social media pages, stream media, browse websites, and so forth. These wireless communication devices may perform such communication by establishing a data session with a wireless communication network operated by a mobile network operator (MNO).

For example, LTE Long-Term Evolution (LTE) is a standard for wireless communication of high-speed data for wireless communication devices. In some aspects, an MNO may provide a wireless communication network that allows for Voice over LTE (VoLTE), in which two-way voice communication is delivered via a data session that is established between a wireless communication device and the wireless communication network.

As the usage of wireless communication networks become more prevalent, the users of wireless communication devices expect telecommunication carriers to provide constant and reliable telecommunication and data communication services.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 4 is a flow diagram of an example process for switching from a default data session to an updated data session for a user device and wireless communication network.

FIG. 5 is a diagram of an example response message generated by a charging engine of a wireless communication network.

FIG. 6 is a block diagram showing an example call flow for establishing a default data session and for switching between the default data session and an updated data session for communications between a user device and a wireless communication network.

DETAILED DESCRIPTION

Figure 1:
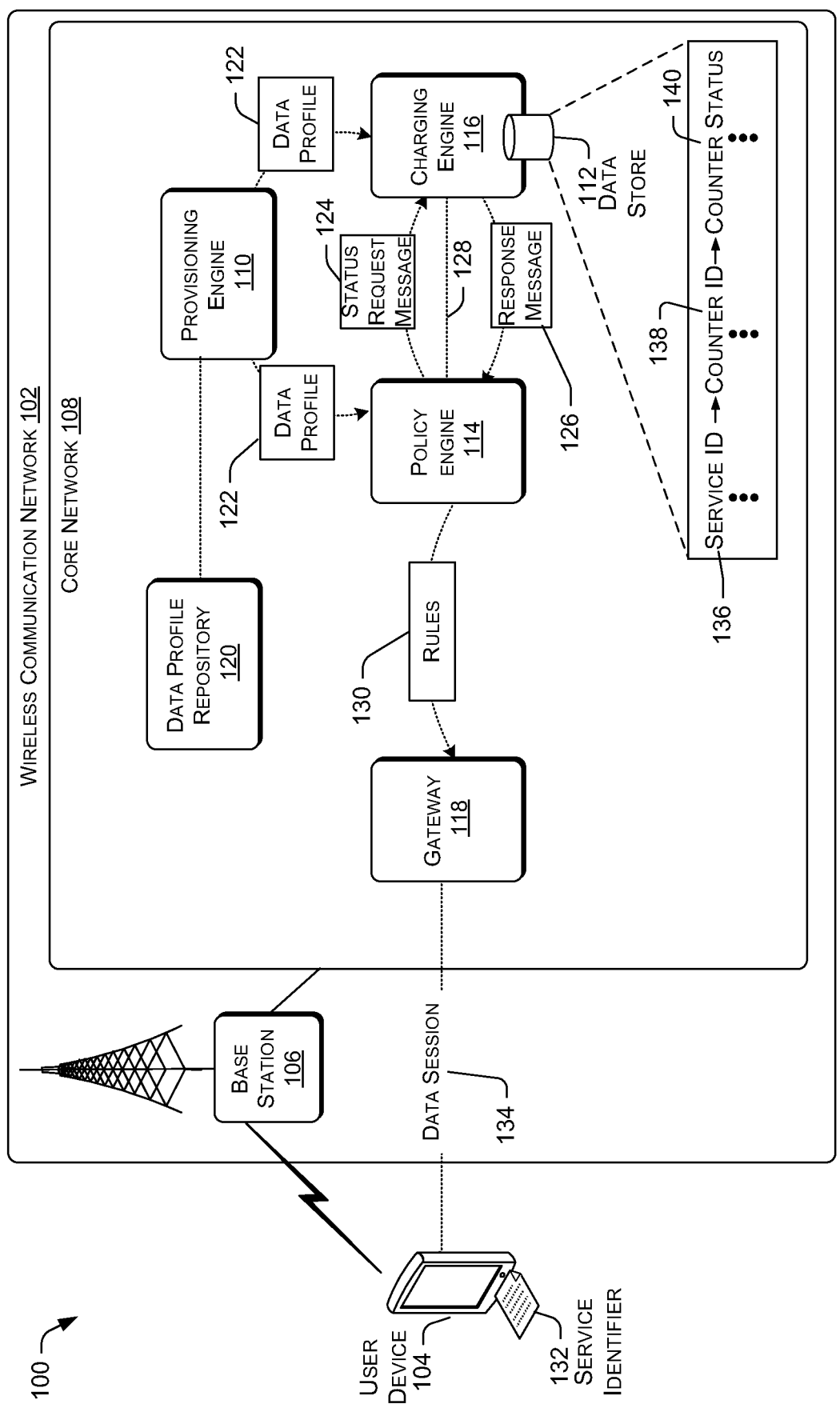
FIG. 1 illustrates an example architecture of a core network in a wireless communication network that implements the establishment of a default data session between a user device and the wireless communication network.

In some aspects, a wireless communication network may include a core network that provides telecommunication and data communication services to multiple user devices. For example, the core network may connect the user devices to other telecommunication and data communication networks, such as the Internet and a public switched telephone network (PSTN). The core network may include several components that support a variety of services provided to subscribers of the wireless communication network. For example, the core network may include a policy engine and a charging engine.

In general, the charging engine is a system that allows a mobile network operator (MNO) to charge their customers (i.e., subscribers), in real time, based on service usage. The charging engine may maintain several counters to monitor the various services offered. The policy engine is a system that aggregates information to and from the network, operational support systems, and other sources (such as portals) in real time. The policy engine also supporting the creation of rules and automatically makes policy decisions for subscribers active on the network. In operation, the policy engine communicates with the charging engine to obtain current usage metrics for a subscriber and then implements one or more policies by communicating with a gateway of the core network.

Upon the initiation of a data session by a user device (e.g., upon powering up the user device), both the policy engine and the charging engine are provisioned with subscriber information (e.g., service identifiers, plan subscriptions, etc.). When the policy engine is provisioned, it initially communicates with the charging engine to obtain session information (e.g., counter status). However, often the policy engine and charging engine are implemented as autonomous systems. That is, the provisioning of the policy engine and the charging engine may be asynchronous. Thus, in some scenarios the charging engine may not be provisioned yet when the policy engine initially communicates with the charging engine to obtain the current session information. In response, the charging engine may generate an error message which may prevent the establishment of a data session between the user device and the wireless communication network.

Accordingly, aspects of the present disclosure are directed to communication between the policy engine and the charging engine of a core network to enable the establishment of a default data session. In particular, aspects of the present disclosure include modifying the charging engine's response to the initiation of a data session when the charging engine is not yet provisioned with the current subscriber information. For example, the charging engine may be modified to generate a default response message that includes nominal data that identifies a session as a default data session rather than generating an error message.

In response to receiving the default response message, the policy engine may implement default policies by communicating one or more rules to the gateway of the core network to enable the default data session. Furthermore, in some aspects, once the charging engine is eventually provisioned with the current subscriber information, the charging engine may subsequently notify the policy engine with an updated response message so that the policy engine may implement the appropriate policies based on the correct counter status for that specific subscriber.

Accordingly, the techniques described herein may prevent the failed establishment of a data session between a user device and the wireless communication network, and instead may allow for the creation of a default data session. As discussed above, such a failure may occur in conventional systems due to the asynchronous nature of one or more of the components of the core network. The failure of the establishment of a data session has the potential to detrimentally affect the ability of subscribers to access the data services provided by the wireless communication network. The techniques described herein may be implemented in a number of ways. Example implementations are provided below with reference to the following figures.

Example Architecture

FIG. 1 illustrates an example architecture 100 of a core network 108 in a wireless communication network 102 that implements the establishment of a default data session 134 between a user device 104 and the wireless communication network 102. The architecture 100 may include the wireless communication network 102 that serves multiple user devices, such as the user device 104. The user device 104 may be a feature phone, a smartphone, a smart watch, a tablet computer, a phablet, an embedded computer system, or any other device that is capable of using the wireless communication services that are provided by the wireless communication network 102.

The wireless communication network 102 may include multiple base stations, such as the base station 106, as well as a core network 108. The wireless communication network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. The base stations are responsible handling voice and data traffic between user devices and the core network 108. In some examples, the base stations may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send radio frequency (RF) signals to user devices and receive radio signals from user devices.

The core network 108 may provide telecommunication and data communication services to multiple user devices. For example, the core network 108 may connect the user devices to other telecommunication and data communication networks, such as the Internet and a public switched telephone network (PSTN). Accordingly, data packet communications via the core network 108 and the Internet may support a variety of services. In various embodiments, the core network 108 may include various components, not illustrated in FIG. 1. For example, the core network 108 may include an IP Multimedia Subsystem (IMS) core, an application function (AF), a Proxy Call Session Control Function (P-CSCF), an IMS registrar server, an Interrogating CSCF (I-CSCF), a Serving CSCF (S-CSCF), a telephony application server (TAS), and the like.

With regards to the specifically illustrated components of FIG. 1, the core network 108 may further include a provisioning engine 110, a policy engine 114, a charging engine 116, a gateway 118, and a data profile repository 120. In some aspects, the data profile repository 120 stores various data profiles (i.e., data profiles 122) related to subscribers (i.e., users) of the wireless communication network 102. For example, the data profile repository 120 may function as a policy solution database to store subscriber profiles, quota, and state information. In some aspects, data profile repository 120 may store subscriber profile information (e.g., service identifiers and corresponding subscription plans), as well as inter-session state information (e.g. usage and quota tracking). In some implementations, the data profile repository 120 may include a user data repository (UDR) and/or a subscription data repository (SDR).

The provisioning engine 110 is configured to prepare and/or equip various components of the core network 108 to allow existing and/or new services to be provided to subscribers. In some examples, the provisioning engine 110 may configured one or more network components to provide subscribers with access to data and technology resources of the wireless communication network.

In some aspects, the provisioning engine 110 may monitor access rights and privileges to ensure the security for the resources of the core network 108 as well as user privacy. The provisioning engine 110 may also ensure compliance and minimize the vulnerability of the core network 108 to penetration and abuse.

As will be described in more detail below, when a user device (e.g., user device 104) attempts to establish a data session (e.g., data session 134) with the wireless communication network 102, the provisioning engine 110 may retrieve one or more data profiles 122 from the data profile repository 120 based on a service identifier 132 associated with the user device 104. In some examples, the service identifier 132 is a Mobile Station International Subscriber Directory Number (MSISDN) associated with a subscriber of the wireless communication network 102. However, in other examples, the service identifier 132 may be an International Mobile Equipment Identity (IMEI), an International Mobile Subscriber Identity (IMSI), or some other unique identifier associated with the user device 104.

The provisioning engine 110 may then forward the data profiles 122 to one or more components of the core network 108, such as the policy engine 114 and the charging engine 116. In some examples, the data profile 122 includes a service identifier (e.g., service identifier 132) and subscription information (e.g., plan details) associated with a subscriber.

The policy engine 114 may be a software component that determines policy and enforces policy rules and serves to establish calls and/or data sessions between the user device 104 and the wireless communication network 102. In various embodiments, the policy engine 114 may be a Policy and Charging Rules Function (PCRF) or another equivalent core network component of the wireless communication network 102. Accordingly, the Policy engine 114 may establish one or more policies that govern the establishment/performance of the data session 134. In some examples, the policy engine 114 implements the policy for a data session based on the data profile 122 as well as on one or more usage metrics maintained by the charging engine 116.

The charging engine 116 may enable the wireless communication network 102 to monitor the services, such as data, voice, text, etc., that are used by each subscriber, and charge the subscribers in real-time based on service usage. In various embodiments, the charging engine 116 may be an Online Charging System (OCS) or another equivalent core network component of the wireless communication network 102. As shown in FIG. 1, the charging engine 116 may be configured to maintain a data store 112 that includes various counters related to a subscriber's usage of the wireless communication network 102. For example, FIG. 1 illustrates the data store 112 as including at least one service ID 136, a corresponding counter, referenced by a counter ID 138, as well as a corresponding counter status 140. In some examples, the counter status 140 represents the current value of the counter (e.g., 1 GB of data used, 200 text messages sent, etc.). However, the counter status 140 may also include other information, such as the amount left (e.g., 2 GB of data remaining, 600 text messages remaining, etc.). In yet another example, the counter status 140 may be a flag that identifies whether a particular subscriber's "bucket" has been filled (e.g., a flag indicating there is data remaining for this subscriber on their plan, a flag indicating there are no text messages remaining for this subscriber on their plan, etc.). In some aspects, the charging engine 116 is configured to create and monitor the various counters based on the data profile 122 received from the provisioning engine 110.

The gateway 118 may include one or more servers and related components that are tasked with providing connectivity between the wireless communication network 102 and the user devices (e.g., the user device 104) by acting as a point of entry and exit for data traffic. Accordingly, the gateway 118 may perform functions such as policy enforcement, packet filtering, packet screening, and/or charging support. In various embodiments, the gateway 118 may be a Packet Data Network Gateway (PGW) or another equivalent core network component of the wireless communication network 102. In some aspects, the gateway 118 may perform the policy enforcement for a data session (e.g., data session 134) based on the one or more rules 130 received from the policy engine 114.

In various embodiments, the policy engine 114, the charging engine 116, and the gateway 118 may act in concert to aid in the establishment of the data session 134 between the user device 104 and the wireless communication network 102. For example, as mentioned above, an attempt to establish a data session (e.g., data session 134) by a user device (e.g., user device 104) may trigger the provisioning engine 110 to retrieve one or more data profiles 122 from the data profile repository 120 based on a service identifier 132 associated with the user device 104. The provisioning engine 110 may then forward the data profiles 122 to the policy engine 114 and the charging engine 116.

The provisioning of the data profile 122 may trigger the policy engine 114 to initiate communication with the charging engine 116 by sending a status request message 124 to the charging engine 116. In some examples, the status request message 124 includes the service identifier (e.g., service identifier 132) and is a request for the status of one or more counters associated with the service identifier.

Accordingly, the charging engine 116 may attempt to retrieve the status of a counter associated with the service identifier by querying the data store 112. However, as discussed above, the policy engine 114 and the charging engine 116 are asynchronous systems. That is, the charging engine 116 may not have received and/or processed the data profile 122 by the time the status request message 124 is received at the charging engine 116. Thus, in this situation, there would be no service identifier included in the data store 112. In conventional systems, the charging engine 116 would then generate and send an error message to the policy engine 114. In response to receiving the error message, the policy engine 114 would then prevent the establishment of the data session 134. In some examples, in order for the user device 104 to reattempt to establish a data session the user device 104 may be required to complete a power recycle (e.g., power off and power on).

Aspects of the present disclosure overcome these limitations by providing a charging engine 116 that is configured to generate and send a response message 126 that includes nominal data. The nominal data may enable the policy engine 114 to implement a default policy for allowing the user device 104 to establish the data session 134. For example, the response message 126 may be formatted similar to a response message that is provided when the charging device 116 has indeed been provisioned by the provisioning engine 110 and where the charging engine 116 would be actively monitoring one or more counters in the data store 112 associated with the corresponding service ID. However, since there is no counter for that service ID yet in the data store 112, the charging engine 116 may generate the response message 126 to include nominal (e.g., 'dummy') data. In some aspects, the nominal data is predetermined and known by both the charging engine 116 and the policy engine 114. The policy engine 114 may further be configured to recognize any response message 126 that includes the nominal data and in response thereto implement a default policy for the data session 134.

Implementation of a default policy by the policy engine 114 may include the policy engine 114 determining a service level for a data session between the user device and the wireless communication network 102 (e.g., default policy includes limiting the data session to 2G data only). In some examples, the default policy is the same for all subscribers and is implemented by the policy engine 114 independent of any subscription information (e.g., data profile 122) associated with the user device 104 that is attempting to establish a data session. However, in other examples, the policy engine 114 may determine the service level on a subscriber to subscriber basis. That is, the policy engine 114 may determine a service level based on the data profile 122 received from the provisioning engine 110. For example, if the data profile 122 indicates that the subscriber associated with the service identifier 132 is currently subscribed to a 4G data plan, the policy engine 114 may send one or more rules 130 to the gateway 118 to enable the data session 134 utilizing 4G data. However, if the data profile 122 indicates that the subscriber is currently subscribed to a 3G-only plan, then the policy engine may send rules 130 to the gateway 118 to limit the data session 134 to 3G-only data.

In some examples, communication between the policy engine 114 and the charging engine is over an Sy interface (e.g., interface 128). The Sy interface enables the transfer of information relating to subscriber spending from charging engine 116 to the policy engine 114 and may support one or more of the following functions: (1) the request of policy counter status reporting from the policy engine 114 to the charging engine 116 (e.g., by way of status request message 124); (2) the notification of counter status from the charging engine 116 to the policy engine 114 (e.g., by way of response message 126); and (3) the cancellation of counter status reporting from policy engine 114 to the charging engine 116.

In some examples, the status request message 124 is a spending limit request (SLR) message communicated from the policy engine 114 to the charging engine 116 over an Sy interface (e.g., interface 128). Similarly, the response message 126 may be spending-status notification request (SNR) message communicated from the charging engine 116 to the policy engine 114 over an Sy interface.

In further aspects, after the charging engine 116 has sent the response message 126, including the nominal data, to the policy engine 114, the charging engine 116 may subsequently be provisioned with the appropriate data profile 122 corresponding to the service identifier 132. Accordingly, the charging engine 116 may then update the data store 112 to include a counter and the corresponding service identifier 132. The charging engine 116 may then generate and send an updated response message (e.g., response message 126) to the policy engine 114. The updated response message may be formatted similar to the previous response message but, rather than including nominal data, may include actual data related to the counter and counter status now included in the data store 112.

In some examples, upon receiving the updated response message, the policy engine may then switch from the default policy to an updated policy that is based on both the data profile 122 and the actual status of the counter associated with the service identifier 132.

Example Computing Device Components

Figure 2:
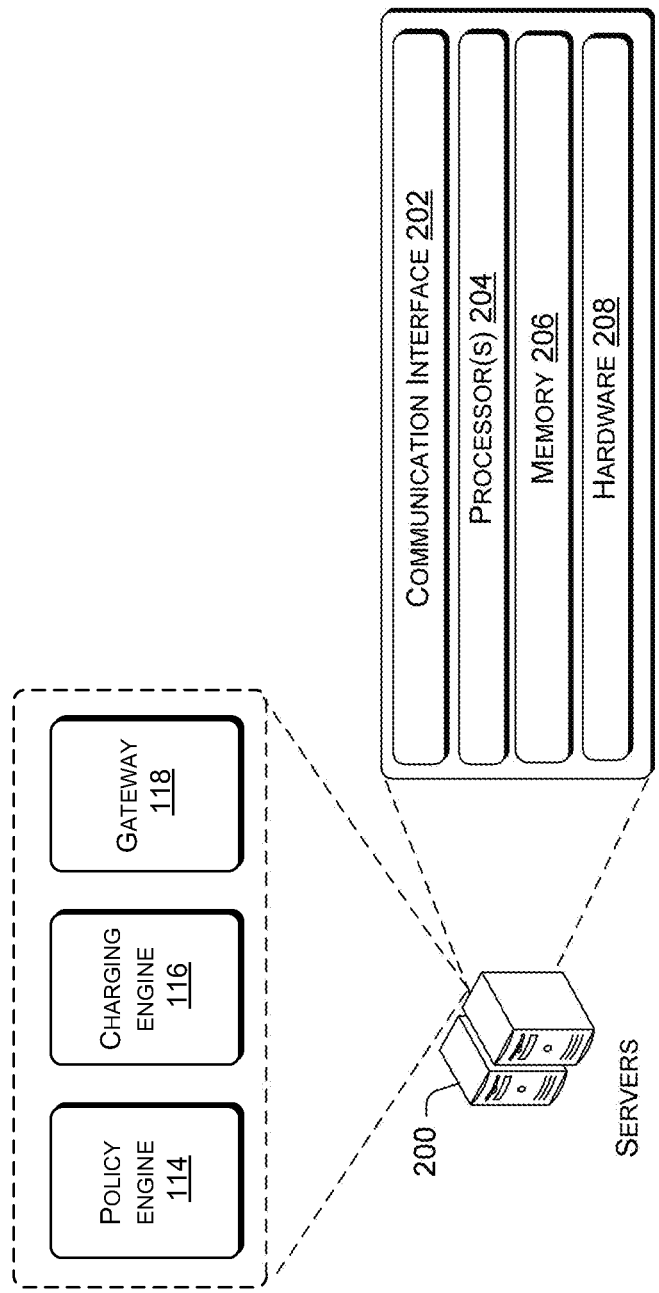
FIG. 2 is a block diagram showing various components of one or more computing devices that support the establishment of a default data session in a wireless communication network.

FIG. 2 is a block diagram showing various components of one or more computing devices that support the core network 108 of the wireless communication network 102 for implementing default data sessions. The computing devices 200 may include a communication interface 202, one or more processors 204, memory 206, and hardware 208. The communication interface 202 may include wireless and/or wired communication components that enable the computing devices 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In various embodiments, the processors 204 and the memory 206 of the computing devices 200 may execute the policy engine 114, the charging engine 116, the gateway 118, as well as other components (e.g., provisioning engine 110) of the core network 108.

Example Processes

Figure 3:
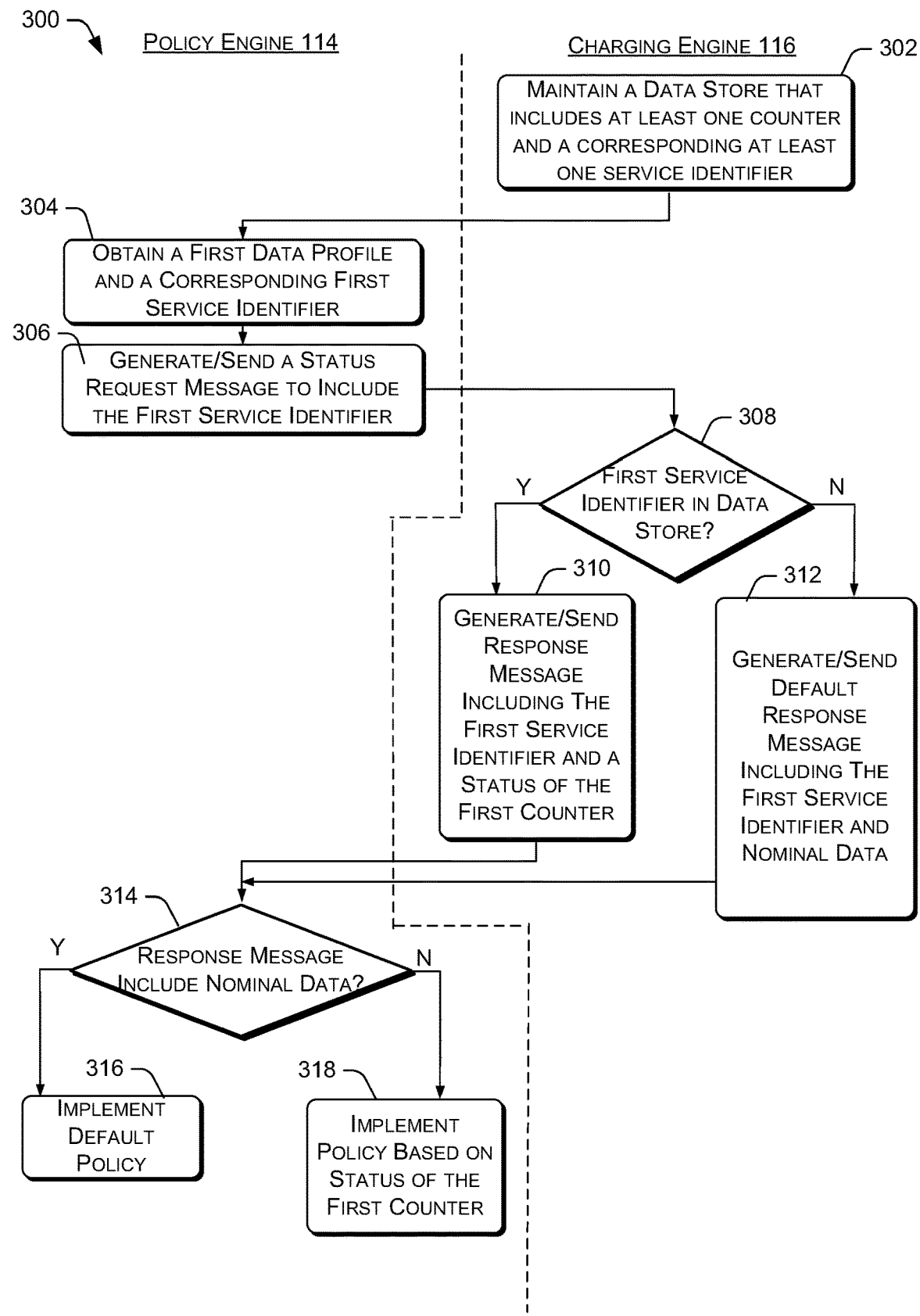
FIG. 3 is a flow diagram of an example process for establishing a default data session in a wireless communication network.

FIG. 3 is a flow diagram of an example process 300 for establishing a default data session in a wireless communication network. FIG. 4 is a flow diagram of an example process 400 for switching from a default data session to an updated data session for a user device and a wireless communication network. Processes 300 and 400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process. For discussion purposes, the processes 300 and 400 are described with reference to the architecture 100 of FIG. 1.

Process block 302, of FIG. 3, illustrates the charging engine 116 maintaining the data store 112 to include at least one counter (e.g., counter ID 138) and a corresponding at least one service identifier (e.g., service ID 136). In one aspect, maintaining the data store 112 may include creating, initializing, and/or updating a counter based on data profiles (e.g., data profile 122) received from the provisioning engine 110. As mentioned above, the data profile 122 may include the service identifier 132 and the current plan information for a subscriber associated with the service identifier 132. The data profile 122 may also include a current status and/or state of the subscriber's usage with respect to their data plan. For example, the data profile 122 may indicate that a subscriber is currently subscribed to a data plan that limits monthly data usage to 2 GB and that they have used 1 GB of data so far this month. Accordingly, the charging engine may create a counter in the data store 112 to monitor the subscriber's data usage and also may initialize the counter to 1 GB.

Next, in process block 304, the policy engine 114 obtains a first data profile (e.g., data profile 122) and a corresponding first service identifier. In some aspects, the policy engine 114 receives the first data profile from the provisioning engine 110 in response to a user device (e.g., user device 104) attempting to establish a data session with the wireless communication network 102.

Next, in process block 306, the policy engine 114 generates a status request message 124 that includes the service identifier included in the data profile 122. Also, in process block 306, the policy engine 114 sends the status request message 124 to the charging engine 116 via interface 128 to request for a status of a counter associated with the service identifier.

In decision block 308, the charging engine 116 determines whether the first service identifier is included in the data store 112. If so, process block 310 includes the charging engine 116 generating and sending a response message (e.g., response message 126) to the policy engine 114. In process block 310, the generation of the response message includes incorporating the service identifier as well as a status of the counter associated with the service identifier (e.g., service ID 136 and counter status 140). The response message is then sent by the charging engine 116 to the policy engine 114.

If, however, in decision block 308, the charging engine 116 determines that the first service identifier is not included in the data store 112 (i.e., the charging engine 116 has not yet been provisioned with the data profile 122), the process 300 proceeds to process block 312. In process block 312, the charging engine 116 generates a default response message. The default response message is then sent by the charging engine 116 to the policy engine 114. As mentioned above, the default response message includes a similar format (e.g., SNR message) as the response message that would be sent in process block 310. However, the default response message includes nominal data rather than data that represents an actual active counter in the data store 112.

The nominal data may be predetermined and known to both the policy engine 114 and the charging engine 116. Accordingly, in decision block 314, the policy engine 114 receives the response message and determines whether the response message is a default response message by determining whether the response message includes the nominal data. If so, process 300 proceeds to process block 316, where the policy engine 114 is triggered to implement a default policy. As mentioned above, implementing the default policy may include the policy engine 114 sending one or more rules 130 to the gateway 118 to allow the establishment of the data session 134 in accordance with a service level policy corresponding to the default policy (e.g., 3G only data).

If, however, in decision block 314, the policy engine 114 determines that the response message does not include the nominal data, then process 300 proceeds to process block 318, where the policy engine 114 implements a policy based on the counter status included in the response message 126. In some examples, implementing the policy in this scenario includes determining a service level for the data session 134 based on both the data profile 122 and on the status of the counter (e.g., the subscriber has purchased a 3G data plan, and has not exceeded their data usage limit, so allow 3G data for data session 134).

Turning now to FIG. 4, process 400 illustrates an example process for switching from a default policy for the data session 134 to an updated policy for the data session 134. That is, the above described process 300 is a process for creating a default policy prior to the charging engine 116 being provisioned with the data profile, while process 400 includes a process for updating the policy after the charging engine 116 is subsequently provisioned with the data profile 122.

For example, in process block 402, the charging engine 116 receives a first data profile (e.g., data profile 122) associated with a first service identifier (e.g., service identifier 132). As mentioned above, the charging engine 116 may receive the first data profile from the provisioning engine 110, where the delay in receiving the first data profile is due to the asynchronous nature of the charging engine 116 with respect to the policy engine 114.

Regardless, once the charging engine 116 receives the first data profile, process block 404 includes updating the data store 112 to include a first counter and the corresponding first service identifier. In some aspects, updating the data store 112 includes creating one or more counters based on the data profile 122. For example, the data profile 122 may indicate that the subscriber has purchased a data plan that includes a data usage limit as well as an SMS messaging limit. Accordingly, the charging engine 116 may create a counter to monitor data usage of the subscriber as well as a counter to monitor SMS messages exchanged by the subscriber.

Next, in process block 406, the charging engine 116 generates and sends an updated response message to the policy engine 114. However, rather than generating the response message to include nominal data, as was done in process block 312, in this case the response message is generated to include the actual data, including the first service identifier and a status of the counter associated with the first service identifier.

Process block 408 illustrates the policy engine 114 receiving the updated response message. Based on receiving the response message, the policy engine 114 may switch from the previously implemented default policy to an updated policy. In some aspects, the updated policy reflects the actual service level to be accorded to the subscriber based on the data profile 122 and on the status of the counter.

FIG. 5 is a diagram of an example response message 502 generated by a charging engine of a wireless communication network. Response message 502 illustrates an example format of the response message 126, regardless of whether the response message 126 included nominal data to trigger a default policy for the data session or whether the response message 126 is to include data representing an actual counter status included in the data store 112. In the illustrated example, response message 502 is an SNR message communicated from the charging engine 116 to the policy engine 114 over an Sy interface. As shown in FIG. 5, response message 502 includes fields 504, 506, 508, and 510. In some examples one or more of the fields 504, 506, 508, and 510 may be modified to include the nominal data when generating response message 502 as a default response message.

Field 504 is illustrated as a 'FeatureName' field. When generating the response message 502 to include the actual data (i.e., not the nominal data), the field 504 may identify a type or particular data plan purchased by the subscriber. In some systems, the policy engine 114 may be required to query the data profile repository 120 to obtain the data profile 122 each time a response message 126 is received at the policy engine 114. That is, each time the policy engine 114 receives an update to a counter maintained by the charging engine 116, the policy engine 114 may be required to send a request to, and wait for a response from, the data profile repository 120. This process of obtaining the data profile 122 may add unwanted delay in the implementation of one or more policies by the policy engine 114. Accordingly, the charging engine 116 may maintain information regarding the subscriber's plan corresponding to a counter included in the data store 112. The field 504 may be populated to signal to the policy engine 114, the data plan associated with this subscriber. Thus, this may enable the policy engine 114 to implement a policy for the data session without having to request the data profile 122 from the data profile repository 120.

The field 506 is illustrated as a policy counter identifier field and may correspond to the counter ID 138 illustrated in FIG. 1. The field 508 is illustrated as a policy counter status field and may correspond to the counter status 140 of FIG. 1. The field 510 is illustrated as a pending policy counter information field.

FIG. 6 is a block diagram showing an example call flow for establishing a default data session and for switching between the default data session and an updated data session for communications between a user device and a wireless communication network. The example call flow 600 illustrates the communications that are sent between the various components of the wireless communication network 102, in which the components may include a UD 602, PGW 604, a PCRF 606, and an OCS 607. In one example, UD 602 corresponds to user device 104 of FIG. 1, PGW 604 corresponds to gateway 118 of FIG. 1, PCRF 606 corresponds to policy engine 114 of FIG. 1, and OCS 608 corresponds to charging engine 116 of FIG. 1. Also illustrated in FIG. 6 is a data store 622 and a data profile 624. Data store 622 may correspond, in some examples, to data store 112 of FIG. 1. Similarly, data profile 624 may correspond, in some examples, to data profile 122 of FIG. 1.

FIG. 6 illustrates the UD 602 attempting to establish a data session with the wireless communication network by exchanging one or more initialization messages 610 with the PGW 604. In response, the PGW 604 may send a credit control request (CCR) command 612 to the PCRF 606. Once provisioned with a data profile from the provisioning engine (e.g., provisioning engine 110 of FIG. 1), the PCRF 606 may send an SLR 614 message to the OCS 608. In some examples, the SLR 614 message corresponds to the status request message 124 of FIG. 1. Next, in response to determining that the OCS 608 has not yet been provisioned, the OCS 608 generates and sends the SNR 616 message to include the nominal data. The SNR 616 message may correspond, in some examples, to response message 126 of FIG. 1. Upon receiving the SNR 616 message, the PCRF 606 may examine the SNR 616 message and determine that it includes the nominal data. If so, the PCRF then sends a credit control answer (CCA) command 618 to the PGW 604. The CCA command 618 may correspond, in some examples, to the one or more rules 130 of FIG. 1. In response to receiving the CCA 618 command, the PGW 604 may enforce the default policy to enable the data session 620.

FIG. 6 also illustrates the subsequent provisioning of the OCS 608. For example, as shown, the data store 622 is provisioned with the data profile 624 after the OCS 608 has already sent the SNR 616 (i.e., default response message) to the PCRF 606. Thus, the OCS 608 may generate another SNR message, shown in FIG. 6 as SNR 626 message. In response to receiving the SNR 626 message, the PCRF 606 may switch from implementing the default policy to an updated policy that more accurately enforces policies associated with a subscriber's actual data plan. To that end, PCRF 606 may send another CCA command, shown in FIG. 6 as CCA 628 command, to the PGW 604. In response to receiving the CCA 628 command, the PGW may enforce one or more rules for the data session 630 in accordance with the updated policy.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   maintaining, at a charging engine of a wireless communication network, a data store that includes at least one counter and a corresponding at least one service identifier of one or more subscribers of the wireless communication network, wherein maintaining the data store includes updating the at least one counter based on a data profile associated with the at least one service identifier;
   receiving a status request message, at the charging engine from a policy engine of the wireless communication network, wherein the status request message is a request for information on a counter associated with a service identifier;
   determining whether the service identifier is included in the data store in response to receiving the status request message;
   generating a default response message in response to determining that the service identifier is not included in the data store, wherein the default response message includes nominal data; and
   sending the default response message to the policy engine to enable the policy engine to implement a default policy for allowing a data session between a user device associated with the service identifier and the wireless communication network, wherein the default policy is determined for a service level associated with the one or more subscribers of the wireless communication network.

2. The computer-implemented method of claim 1, further comprising:
   receiving, at the charging engine, a data profile associated with the service identifier;
   updating the data store to include the counter and the service identifier based on the data profile;
   generating an updated response message to include the service identifier and a status of the counter; and
   sending the updated response message to the policy engine to trigger the policy engine to switch from the default policy to an updated policy for the data session.

3. The computer-implemented method of claim 1, wherein the service identifier comprises a Mobile Station International Subscriber Directory Number (MSISDN) associated with a subscriber of the wireless communication network.

4. The computer-implemented method of claim 1, wherein receiving the status request message comprises receiving a spending limit request (SLR) message over an Sy interface between the policy engine and the charging engine.

5. The computer-implemented method of claim 1, wherein sending the default response message comprises sending a spending status notification request (SNR) message over an Sy interface between the policy engine and the charging engine.

6. The computer-implemented method of claim 5, wherein the SNR message comprises one or more fields that include the nominal data.

7. The computer-implemented method of claim 6, wherein the one or more fields include at least one of: (1) a policy counter identifier field, (2) a policy counter status field, or (3) a pending policy counter information field.

8. A computer-implemented method, comprising:
   generating, by a policy engine of a wireless communication network, a status request message to include a service identifier of a subscriber of the wireless communication network, wherein the status request message is a request for a status of a counter associated with the service identifier;
   sending the status request message to a charging engine of the wireless communication network;
   receiving a response message from the charging engine in response to sending the status request message;
   determining whether the response message includes nominal data;
   determining a default policy for a service level associated with the subscriber of the wireless communication network; and
   implementing the default policy for allowing a default data session between a user device associated with the service identifier and the wireless communication network in response to determining that the response message includes the nominal data.

9. The computer-implemented method of claim 8, further comprising:
   receiving, at the policy engine, an updated response message from the charging engine, wherein the updated response message includes the service identifier and the status of the counter; and
   switching from the default policy to an updated policy for the data session.

10. The computer-implemented method of claim 8, wherein the service identifier comprises a Mobile Station International Subscriber Directory Number (MSISDN) associated with the subscriber of the wireless communication network.

11. The computer-implemented method of claim 8, wherein sending the status request message comprises sending a spending limit request (SLR) message over an Sy interface between the policy engine and the charging engine.

12. The computer-implemented method of claim 8, wherein receiving the response message comprises receiving a spending status notification request (SNR) message over an Sy interface between the policy engine and the charging engine.

13. The computer-implemented method of claim 12, wherein the SNR message comprises one or more fields that include the nominal data.

14. The computer-implemented method of claim 13, wherein the one or more fields include at least one of: (1) a policy counter identifier field, (2) a policy counter status field, or (3) a pending policy counter information field.

15. The computer-implemented method of claim 8, wherein implementing the default policy comprises sending one or more rules to a gateway of the wireless communication network for allowing the default data session.

16. One or more computing devices of a wireless communication network, the one or more computing devices comprising:
one or more processors; and
memory having instructions stored therein, the instructions, when executed by the one or more processors, cause the one or more processors to perform acts comprising:
maintaining, at a charging engine of the wireless communication network, a data store that includes at least one counter and a corresponding at least one service identifier of one or more subscribers of the wireless communication network, wherein maintaining the data store includes updating the at least one counter based on at least one data profile associated with the at least one service identifier;
obtaining, at a policy engine of the wireless communication network, a data profile and a corresponding service identifier of a subscriber of the wireless communication network, wherein the policy engine is configured to implement a policy for establishing a data session between the wireless communication network and a user device associated with the service identifier based on: (1) the data profile and (2) a status of a counter associated with the service identifier;
generating, by the policy engine, a status request message to include the service identifier, wherein the status request message is a request for the status of the counter;
sending the status request message to the charging engine;
receiving the status request message at the charging engine;
determining whether the service identifier is included in the data store in response to receiving the status request message;
generating, by the charging engine, a default response message in response to determining that the service identifier is not included in the data store, wherein the default response message includes nominal data;
sending the default response message to the policy engine;
receiving the default response message from the charging engine;
determining, by the policy engine, whether the default response message includes the nominal data; and
implementing, by the policy engine, a default policy for allowing a default data session between the user device and the wireless communication network in response to determining that the default response message includes the nominal data, wherein the default policy is determined for a service level associated with the one or more subscribers of the wireless communication network.

17. The one or more computing devices of claim 16, wherein the acts further comprise:
receiving, at the charging engine, the data profile associated with the service identifier;
updating the data store to include the counter and the service identifier based on the data profile;
generating, by the charging engine, an updated response message to include the service identifier and the status of the counter;
sending the updated response message to the policy engine;
receiving, at the policy engine, the updated response message; and
switching, by the policy engine, from the default policy to an updated policy for the data session.

18. The one or more computing devices of claim 16, wherein the service identifier comprises a Mobile Station International Subscriber Directory Number (MSISDN) associated with the subscriber of the wireless communication network.

19. The one or more computing devices of claim 16, wherein the default response message comprises a spending status notification request (SNR) message comprising one or more fields that include the nominal data, wherein the one or more fields include at least one of: (1) a policy counter identifier field, (2) a policy counter status field, or (3) a pending policy counter information field.

* * * * *